UNITED STATES PATENT OFFICE.

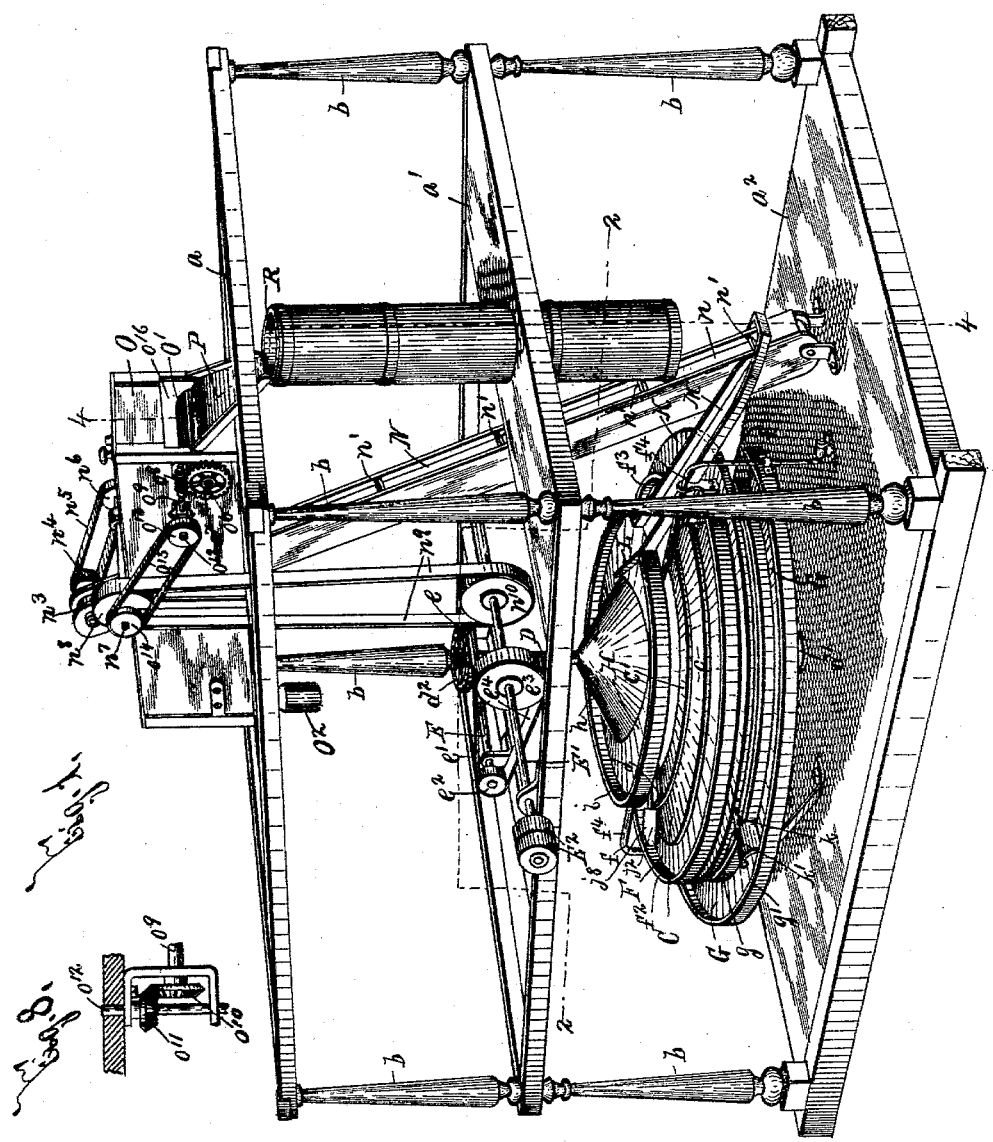

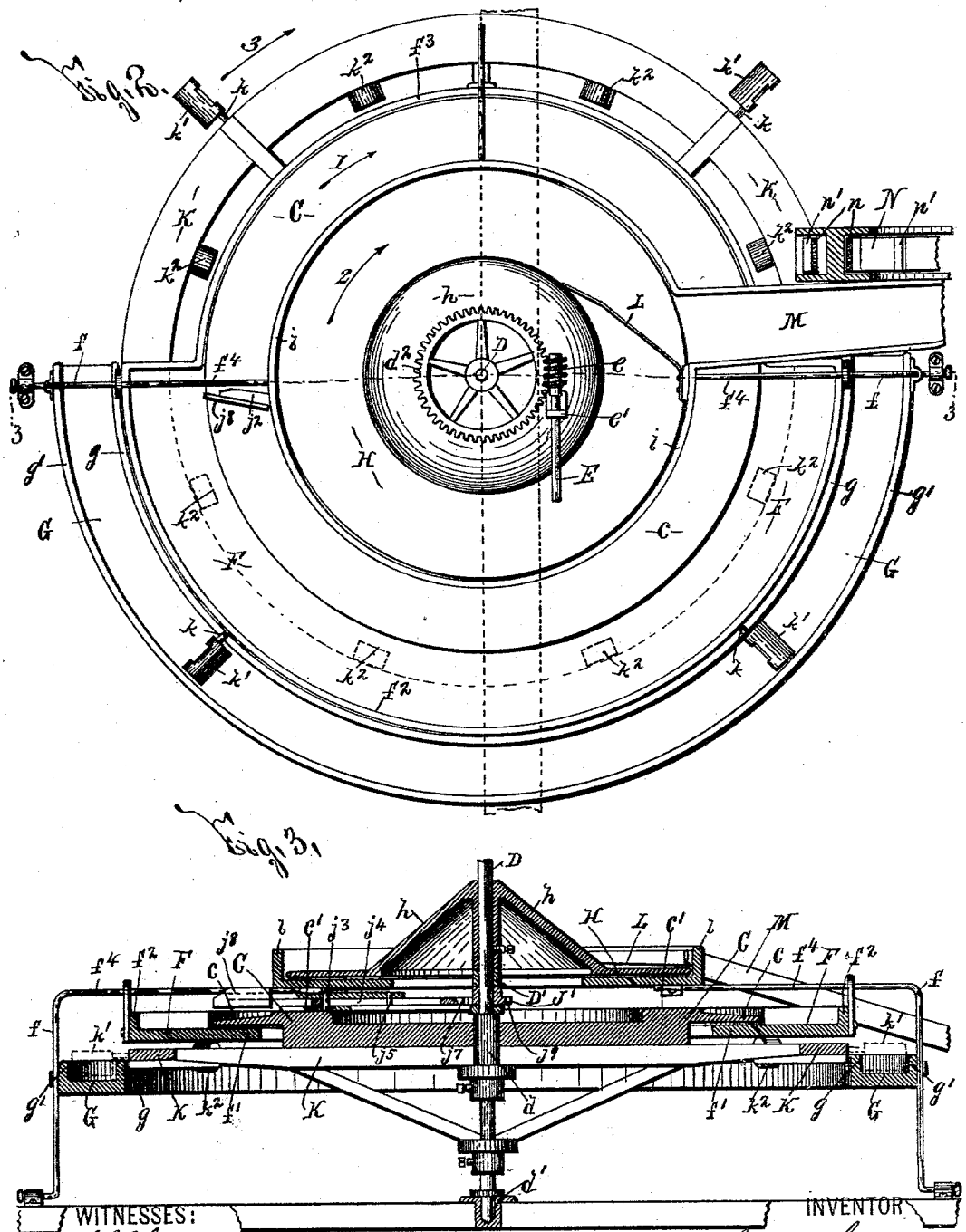

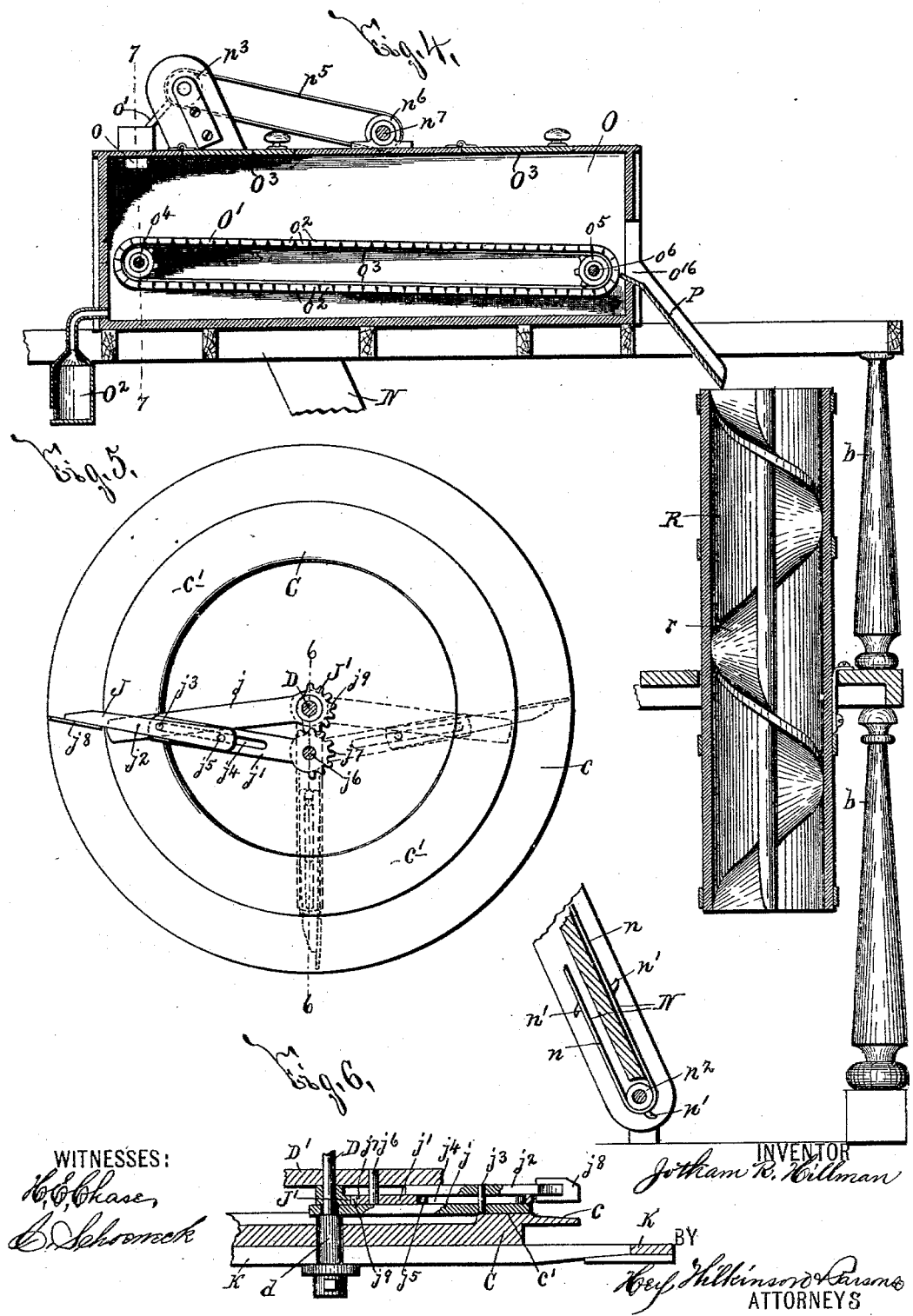

JOTHAM R. HILLMAN, OF SHORTSVILLE, NEW YORK.

FRUIT-HANDLING MACHINE.

SPECIFICATION forming part of Letters Patent No. 562,824, dated June 30, 1896.

Application filed April 4, 1894. Serial No. 506,271. (No model.)

*To all whom it may concern:*

Be it known that I, JOTHAM R. HILLMAN, of Shortsville, in the county of Ontario, in the State of New York, have invented new and useful Improvements in Fruit-Handling Machines, of which the following, taken in connection with the accompanying drawings, is a full, clear, and exact description.

My invention relates to improvements in fruit-handling machines particularly applicable for conveying fruit to and away from an operator or operators for trimming the same, and has for its object the production of a device which is convenient and efficient, conveys a constant supply of untrimmed fruit to the operator or operators, removes the trimmings, and conveys the trimmed fruit quickly, positively, automatically, and continuously; and to this end it consists, essentially, in the construction and arrangement of the parts, all as hereinafter more particularly described, and pointed out in the claims.

In describing this invention reference is had to the accompanying drawings, forming a part of this specification, in which like letters indicate corresponding parts in all the views.

Figure 1 is a perspective of my invention, shown as operatively supported by a series of substantially horizontal supporting walls or floors. Fig. 2 is an enlarged transverse horizontal sectional view taken on line 2 2, Fig. 1, the main shaft and a portion of the supplemental shaft and the means for discharging the untrimmed fruit and the trimmings being omitted. Fig. 3 is a vertical sectional view taken on line 3 3, Fig. 2. Fig. 4 is an enlarged vertical sectional view taken on line 4 4, Fig. 1. Fig. 5 is a top plan view of the detached carrier for the untrimmed fruit and the means for forcing the fruit from said carrier. Fig. 6 is a vertical sectional view taken on line 6 6, Fig. 5, a portion of the supporting-frame for the means for removing the fruit-trimmings being also illustrated. Fig. 7 is a transverse vertical sectional view taken on line 7 7, Fig. 4; and Fig. 8 is a detail sectional view of a pair of shafts for transmitting motion to the feed within the bleaching-chamber.

The frame for supporting my invention is here illustrated as a series of horizontal walls or floors $a$ $a'$ $a^2$, connected by interposed uprights $b$, and, although it is evident that this frame may be of any desirable form, size, and construction, it preferably consists of the floors of a suitable building for containing my invention.

C is a carrier for the untrimmed fruit, and, although this carrier may be suitably constructed and arranged, it is preferably formed circular, and is revolved in the direction indicated by arrow 1, Fig. 2, by a suitable shaft D, provided with a hub or sleeve $d$, fixed to said shaft and to the carrier. The outer portion of the carrier is formed with a circular downwardly-inclined face $c$, which receives and supports the fruit discharged thereupon by any suitable means. (Not necessary to herein illustrate or describe.) The untrimmed fruit is, however, preferably discharged upon the rear portion of the face $c$, or that portion thereof arranged opposite to the means, presently described, for removing or forcing the fruit from said carrier.

The lower end of the shaft D is supported in a step $d'$ or other bearing secured to the wall $a^2$, and its upper end is connected in any desired manner to suitable power-transmitting mechanism. As here illustrated, the upper end of the shaft D is provided with a worm-wheel $d^2$, meshing with a worm $e$, secured to a supplemental driving-shaft E, which is journaled in bearings $e'$, mounted upon the wall $a'$. A main shaft E' is arranged in proximity to the supplemental shaft E, and suitable pulleys $e^2$ $e^3$, mounted, respectively, on the shafts E E', and a belt $e^4$, running over the pulleys $e^2$ $e^3$, transmit motion from the shaft E' to the shaft E. If desired, the shaft E' may be provided with tight and loose pulleys $E^2$, to which power is transmitted by any suitable mechanism. (Unnecessary to herein illustrate or describe.)

Suitable means, presently described, discharges the untrimmed fruit from the carrier C to a support F, arranged beneath the carrier C and projecting beyond its outer edge. The support F, which is preferably stationary, is mounted upon suitable uprights $f$ and projects beyond only the front half of the carrier C or that portion thereof along which is movable the means, presently described, for removing or feeding the fruit therefrom. The support F is therefore formed substantially semicircular, and is provided with an inwardly-extending portion $f'$, arranged beneath the carrier C and formed substantially circular, with the outer edge of its rear half extended slightly beyond the outer edge of the carrier C, although not designed to support the fruit discharged from said carrier C. A shoulder $f^2$ projects upwardly from the outer edges of the support F for preventing the escape of the fruit from said support, and a similar shoulder $f^3$ projects upwardly from the outer edge of the rear half of the inwardly-extending circular portion of the support F for preventing the escape of the fruit from the rear half of the carrier C.

Directly beneath the support F, from which the operators remove the fruit for trimming the same and then placing it upon a conveyer H, presently described, is a support G, arranged beneath and having its outer portion projecting beyond the outer edge of the support F. The support G, which is also preferably semicircular, is secured to the uprights $f$, and is provided with inner and outer upwardly-extending shoulders $g$ $g'$, between which the trimmings for the fruit are inserted or dropped by the operator. These trimmings are removed by means presently described, and the trimmed fruit is placed or thrown upon the conveyer H, which is suitably secured to the shaft D, previously described. This conveyer H is preferably circular, is formed of less diameter than the carrier C, and is arranged directly above said carrier C. The central portion of the conveyer H is formed with an upwardly-extending conical projection $h$, along which the fruit feeds downwardly upon the outer edge of said conveyer when placed or thrown upon said projection. It is evident, however, that, if desired, this conical projection may be dispensed with.

The fruit is conveyed from the feeding-conveyer H by suitable means, presently described, and its undue escape from said conveyer is prevented by an upwardly-extending shoulder $i$, arranged at its outer edge and provided upon a ring-shaped frame suitably secured to inwardly-extending arms $f^4$, formed upon the upper ends of the uprights $f$.

The means, previously mentioned, for forcing the untrimmed fruit from the carrier C may be suitably constructed, but preferably consists of a feeding-arm J, movable to its operative position in the same direction as the carrier C in an arc substantially equal to the length of the support F, and movable in a reverse direction for a similar distance for forcing the fruit from said carrier C.

The feeding-arm J consists of sections $j, j'$, and $j^2$, and, as best seen at Figs. 5 and 6, the inner end of the section $j$ is loosely mounted on the shaft D, and is therefore movable on substantially the same axis as the carrier C. The outer end of the section $j$ is connected by a pivotal pin $j^3$ to the central portion of the engaging-section $j^2$, and the central portion of the pin $j^3$ is movable in a longitudinal slot $j^4$ in the actuating-section $j'$. The rear end of the section $j^2$ is provided with a pin $j^5$, movable in the slot $j^4$, and the corresponding end of the section $j'$ is mounted on a pivot $j^6$, arranged eccentric to the pivot for the section $j$. The pivot $j^6$ is carried by any desirable support, as a stationary arm D', which is suitably secured to the ring-shaped frame, previously mentioned, provided with the shoulders $i$. The inner end of the section $j'$ is also provided with an arc-shaped toothed engaging face $j^7$. The free end of the section $j^2$ is provided with a shoulder or engaging blade or sweep $j^8$ movable along the carrier C for forcing the fruit therefrom.

The feeding-arm J is actuated by any suitable device (here illustrated as a segment J') secured to the shaft D, and formed with an arc-shaped toothed engaging face $j^9$ for engaging the similar face $j^7$ of the section $j'$, and rocking the section $j'$ on the pivot $j^6$, and thereby forcing the free end of the section $j^2$ in a direction opposite to that of the carrier C. As the segment J' is revolved by the shaft D, and the section $j'$ of the feeding-arm J is rocked on its pivot $j^6$, the faces $j^7 j^9$ are disengaged from each other, and the movement of the feeding-arm in a direction opposite to that of the carrier C ceases. The free end of the section $j$ of the feeding-arm rests upon a face $c'$ of the carrier C, and the inner end of the section $j'$ of said arm is mounted on the pivot $j^6$, secured to the arm D'. Consequently, after the disengagement of the faces $j^7 j^9$, the feeding-arm J is moved in the same direction as the carrier C until the feeding-arm assumes its operative position, (illustrated at Figs. 2 and 5,) whereupon the segment J' engages the toothed face of the section $j'$, and moves the feeding-arm in a direction opposite to that of the carrier C for discharging the fruit. During the reverse movement of the feeding-arm, its section $j^2$ moves lengthwise of the section $j'$, and consequently said feeding-arm is longitudinally adjustable.

The means, previously mentioned, for forcing the fruit-trimmings from the support G may also be suitably constructed, but preferably consists of one or more arms $k$, projecting radially from a revoluble frame or support K, suitably secured to the shaft D. Each arm is formed with a depending rearwardly inclined or curved shoulder $k'$, movable between the shoulders $g$ $g'$ of the support G. The frame K is provided with rollers $k^2$, bearing against the under face of the support F for reducing to a minimum the friction incidental to the revolution of said frame and of the shaft D for effecting its revolution.

The means, previously mentioned, for forcing the trimmed fruit from the conveyer H, is also suitably constructed, but preferably consists of a stationary or fixed bar L, extending above the conveyer H in a plane substantially tangential to the conical projection $h$ of said conveyer. If desired, this bar may be formed of spring material, and, as illustrated, its free end extends in proximity to the base of the projection $h$, and its opposite end is suitably secured to the shoulder $i$.

The fruit discharged from the conveyer H enters a downwardly-extending chute M, and is thereby conducted to the lower end of a suitable conveyer N, extending upwardly above the carrier C, support G, and conveyer H, in convenient proximity to a suitable bleaching or other similar chamber O. The conveyer N is of any suitable form, size, and construction, and is provided with an endless carrier $n$, having shoulders $n'$ for engaging and elevating or carrying the fruit. The lower end of the conveyer passes over an idler $n^2$ and its upper end over a driving-wheel $n^3$, secured to a suitable shaft provided with a pulley or other power-transmitting wheel $n^4$. A belt $n^5$ passes over the pulley $n^4$, and is driven by a pulley $n^6$, mounted upon a shaft $n^7$. The shaft $n^7$ is provided with a pulley $n^8$, conected by a belt $n^9$ to a driving-wheel $n^{10}$ upon the shaft E', previously described. The chamber O is also of any desirable form, size, and construction, and is provided at one end with a laterally-extending inlet-conduit $o$, Fig. 7, having its outer extremity arranged in proximity to the upper end of the conveyer N. A suitable guide $o'$ extends upwardly from one side of the conduit $o$ toward the carrier $n$, and conducts the fruit discharged from said conveyer into the conduit $o$.

Directly beneath the conduit $o$ is a suitable feed arranged longitudinally within the chamber O and consisting preferably of an endless belt O', composed of transverse slats or bars $o^2$ and endless chains $o^3$. One extremity of the belt O' is passed over an idler $o^4$ and its opposite extremity over a driving-wheel $o^5$, mounted on a shaft $o^6$, connected by a worm-wheel $o^7$ and a worm $o^8$ to a shaft $o^9$. The shaft $o^9$ is provided with a pinion $o^{10}$, meshing with a pinion $o^{11}$ upon a spindle $o^{12}$, and the spindle $o^{12}$ is connected by pulleys $o^{13}$ $o^{14}$ and a belt $o^{15}$ to the shaft $n^7$, previously described.

The belt O' conveys the fruit through the chamber O to the outlet $o^{16}$, formed in one end of said chamber, whence it passes along the downwardly-extending guide P into a suitable receptacle R, formed with a spiral guide $r$. This receptacle conducts the fruit to the desired locality, whence it may be conveyed by any suitable apparatus or device. (Not necessary to herein illustrate or describe.) The chamber O may be provided with a suitable generator O² for the bleaching-current and with outlet-doors O³ O³ in the top of the casing. I have briefly described the bleaching-chamber O and the feed within the same in order that the operation of my invention may be readily understood; but it will be understood that said chamber and feed form no part of my present invention.

As will be readily perceived upon reference to the drawings and the foregoing description, the untrimmed fruit is conducted by a carrier to the operators arranged around the support F, upon which the fruit is discharged from the carrier C by the feeding-arm J, the trimmings are removed from the fruit and dropped upon the support G, from which they are discharged by the arms $k$ of the frame K, the trimmed fruit is placed or thrown upon the conveyer H, and is removed by the bar L to a chute M for conducting the same to the upwardly-extending conveyer N, which discharges the fruit within a bleaching-chamber, and the feed O', arranged longitudinally within the bleaching-chamber, conveys the fruit therethrough and discharges the same into the downwardly-extending guide P, whence the bleached fruit escapes into a suitable receptacle R, provided with a downwardly-extending spiral guide.

My invention handles the fruit with great rapidity and efficiency, and is convenient and practical. It conveys a constant supply of untrimmed fruit to the operator or operators, removes the trimmings, and conveys the trimmed fruit quickly, positively, automatically, and continuously.

The exact detail construction and arrangement of the parts of my fruit-handling machine may be considerably varied without departing from the spirit of my invention, and hence I do not herein limit myself to such exact detail construction and arrangement.

Having thus fully described my invention, what I claim as new, and desire to secure by Letters Patent, is—

1. The combination of a carrier for the fruit, a support for the trimmings from the fruit arranged beneath the carrier and having curved upright shoulders, and a rotary arm having a depending shoulder movable between said upright shoulders for removing the trimmings from the latter support, substantially as and for the purpose specified.

2. The combination of a carrier for the fruit, a feeding-arm for removing the fruit from said carrier, and means for moving the feeding-arm to its operative position in the same direction as the carrier, and for moving the feeding-arm in an opposite direction to discharge the fruit from the carrier, substantially as set forth.

3. The combination of a carrier for the fruit, a stationary support for the fruit, a feeding-arm for forcing the fruit from the carrier to the support, and means for moving the feeding-arm to its operative position in the same direction as the carrier, and for moving the feeding-arm in an opposite direction to discharge the fruit from the carrier, substantially as described.

4. The combination of a carrier for the fruit, and a lengthwise adjustable feeding-arm movable in one direction for assuming an operative position, and in an opposite direction for removing the fruit from the carrier, substantially as set forth.

5. The combination of a rotary carrier for the fruit, a stationary support for the fruit, and a feeding-arm automatically adjustable lengthwise and movable in one direction for assuming an operative position, and in an opposite direction for forcing the fruit from the carrier to the support, substantially as described.

6. The combination of a carrier for the fruit, a feeding-arm movable to its operative position in the same direction as the carrier, and means detachably engaged with the feeding-arm for forcing the same in an opposite direction to discharge the fruit from the carrier, substantially as specified.

7. The combination of a rotary carrier for the fruit, a feeding-arm movable to its operative position in the same direction as the carrier, and a rotary segment detachably engaged with the feeding-arm for forcing the same in an opposite direction to discharge the fruit from the carrier, substantially as set forth.

8. The combination of a carrier for the fruit, a feeding-arm movable in one direction for assuming an operative position, and in an opposite direction for removing the fruit from the carrier, a support for the trimmings from the fruit, and a rotary feed for removing the trimmings from the latter support, connected to the feeding-arm, substantially as described.

9. The combination of a revoluble carrier for the fruit, a support for the fruit, a swinging feeding-arm for forcing the fruit from the carrier to the support, a stationary support for the trimmings from the fruit, and a revoluble feeding-arm for removing the trimmings from said stationary support, substantially as specified.

10. The combination of a revoluble carrier for the fruit, a stationary support for the fruit arranged beneath and projecting beyond the outer edge of the carrier, a reversely-movable blade or sweep for forcing the fruit from the carrier to said support, a second stationary support for receiving the trimmings from the fruit arranged beneath and projecting beyond the outer edge of the first support, and a rotary feeding-arm for removing the trimmings from the latter support connected to said blade or sweep, substantially as and for the purpose set forth.

11. The combination of a carrier for the fruit movable on an axis, and a feeding-arm for engaging the fruit on the carrier, said arm consisting of a section movable on substantially the same axis as the carrier, an actuating-section movable on an axis arranged eccentric to the former axis, and an engaging section pivoted to the first section and movable lengthwise of the actuating-section, substantially as and for the purpose described.

12. The combination of a carrier for the fruit movable on an axis, a feeding-arm consisting of a section movable on substantially the same axis as the carrier, an actuating-section movable on an axis arranged eccentric to the former axis and formed with an arc-shaped toothed engaging face, and an engaging section pivoted to the first section and movable lengthwise of the actuating-section, and a segment movable on substantially the same axis as the carrier and formed with an arc-shaped toothed engaging face for detachably engaging the similar face of the actuating-section of the feeding-arm, substantially as and for the purpose set forth.

13. The combination of a carrier for the fruit, and a reversely-movable blade or sweep for removing the fruit from the carrier; with a conveyer for the fruit, and means for removing the fruit from the conveyer, substantially as and for the purpose specified.

14. The combination of a rotary conveyer for the fruit provided with a substantially conical central projection, and means for removing the fruit from the conveyer, substantially as and for the purpose set forth.

15. The combination of a carrier for the fruit, a reversely-movable blade or sweep for removing the fruit from the carrier, a conveyer for the fruit arranged above the carrier and provided with a substantially conical central projection, and means for removing the fruit from the conveyer, substantially as specified.

16. The combination of a conveyer for the fruit, a chute extending downwardly from the conveyer for receiving the fruit, means for forcing the fruit from the conveyer into the chute, and an upwardly substantially extending conveyer for feeding the fruit from the chute, substantially as and for the purpose set forth.

In testimony whereof I have hereunto signed my name, in the presence of two attesting witnesses, at Syracuse, in the county of Onondaga, in the State of New York, this 27th day of January, 1894.

JOTHAM R. HILLMAN.

Witnesses:
CLARK H. NORTON,
E. A. WEISBURG.